US009111692B2

(12) United States Patent
Hamanaka et al.

(10) Patent No.: US 9,111,692 B2
(45) Date of Patent: Aug. 18, 2015

(54) METHOD FOR MANUFACTURING LAMINATED CERAMIC ELECTRONIC COMPONENT

(71) Applicant: MURATA MANUFACTURING CO., LTD., Nagaokakyo-shi, Kyoto-Fu (JP)

(72) Inventors: Kenichi Hamanaka, Nagaokakyo (JP); Eiji Ito, Nagaokakyo (JP); Yasuharu Yamashita, Nagaokakyo (JP); Kenichi Okajima, Nagaokakyo (JP); Togo Matsui, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/105,387

(22) Filed: Dec. 13, 2013

(65) Prior Publication Data

US 2014/0096890 A1  Apr. 10, 2014

Related U.S. Application Data

(63) Continuation of application No. PCT/JP2012/061010, filed on Apr. 25, 2012.

(30) Foreign Application Priority Data

Jun. 15, 2011 (JP) ................................. 2011-133031

(51) Int. Cl.

| | | |
|---|---|---|
| *H01G 4/30* | (2006.01) | |
| *H01G 4/12* | (2006.01) | |
| *H01G 7/00* | (2006.01) | |
| *H01G 13/00* | (2013.01) | |
| *B32B 37/00* | (2006.01) | |
| *B32B 38/00* | (2006.01) | |
| *C04B 37/00* | (2006.01) | |

(52) U.S. Cl.
CPC . *H01G 4/30* (2013.01); *H01G 4/12* (2013.01); *B32B 37/00* (2013.01); *B32B 38/0004* (2013.01);

(Continued)

(58) Field of Classification Search
CPC ............. H01G 4/12; H01G 4/30; H01G 7/00; H01G 13/00; H01G 1/14; H01G 1/22; B32B 37/00; B32B 38/0004
USPC ........................................................ 156/89.12
See application file for complete search history.

(56) References Cited

U.S. PATENT DOCUMENTS 4,771,520 A * 9/1988 Tanaka et al. ................. 29/25.42
7,063,014 B2 * 6/2006 Hashimoto et al. ........... 101/150

(Continued)

FOREIGN PATENT DOCUMENTS

JP           61-248413 A      11/1986
JP         2010267915 A  *  11/2010

(Continued)

OTHER PUBLICATIONS

Dooka et al., "JP 2010-267915, machine translation", published Nov. 25, 2010.*

(Continued)

*Primary Examiner* — Alex Efta
(74) *Attorney, Agent, or Firm* — Arent Fox LLP

(57) ABSTRACT

A method for manufacturing a laminated ceramic electronic component, which includes the steps of preparing a laminate chip having opposed end edges of internal electrodes exposed at opposed side surfaces of the laminate chip; forming a first insulator section and a second insulator section, respectively, on opposed side surfaces of the laminate chip by pressing against a metal plate with a volume of grooves filled with a paste, and swinging the metal plate in any direction when pulling the laminate chip away from the metal plate; and firing the laminate chip with the first insulator section and second insulator section formed thereon. The paste has a viscosity of 500 Pa·s to 2500 Pa·s, and a content C (vol %) of an inorganic solid satisfies a predetermined condition.

10 Claims, 6 Drawing Sheets

(52) U.S. Cl.
CPC ............ *C04B 37/00* (2013.01); *C04B 2237/00* (2013.01); *C04B 2237/12* (2013.01); *H01G 7/00* (2013.01); *H01G 13/00* (2013.01)

(56) References Cited

U.S. PATENT DOCUMENTS

| | | | |
|---|---|---|---|
| 8,570,709 B2 | 10/2013 | Itamura | |
| 8,584,332 B2 * | 11/2013 | Matsui et al. | 29/25.42 |
| 2010/0146778 A1 * | 6/2010 | Dooka et al. | 29/832 |
| 2012/0233828 A1 * | 9/2012 | Matsui et al. | 29/25.42 |

FOREIGN PATENT DOCUMENTS

| | | |
|---|---|---|
| JP | 2011-003847 A | 1/2011 |
| TW | 200921713 A | 5/2009 |
| TW | 201115602 A | 5/2011 |

OTHER PUBLICATIONS

PCT/JP2012/061010 ISR dated Jul. 31, 2012.
PCT/JP2012/061010 Written Opinion dated Jul. 31, 2012.

* cited by examiner (a)

(b)

(c)

(a)

(b)

(c)

METHOD FOR MANUFACTURING LAMINATED CERAMIC ELECTRONIC COMPONENT

CROSS REFERENCE TO RELATED APPLICATIONS

The present application is a continuation of International application No. PCT/JP2012/061010, filed Apr. 25, 2012, which claims priority to Japanese Patent Application No. 2011-133031, filed Jun. 15, 2011, the entire contents of each of which are incorporated herein by reference.

FIELD OF THE INVENTION

The present invention relates to a method for manufacturing a laminated ceramic electronic component such as a laminated ceramic capacitor.

BACKGROUND OF THE INVENTION

Conventionally, an unfired laminate chip for a laminated ceramic electronic component is manufactured in such a way that a large number of internal electrodes for one laminate chip are printed in a matrix on ceramic green sheets, and the ceramic green sheets are stacked as required, subjected to pressure bonding, and cut into one chip. This method has a need to ensure insulator sections with a certain width on side surfaces (surfaces with no extraction electrodes) of the laminate chip, in relation to the accuracy in stacking position of the ceramic green sheets and the positional accuracy for cutting into the shape of the laminate chip. Therefore, the provision of the insulator sections has problems such as a case of the increased size of the laminate chip and the acquired capacitance decreased because of the decreased area of the internal electrode. In addition, the sections with the internal electrodes printed are increased in thickness by the amount of the internal electrodes. Therefore, the increased number of electrodes stacked produces substantial differences in height between the sections with the internal electrodes printed and the insulator sections. There is also the problem of structural defect generation in the fired laminate chip due to the influence of these differences.

As a method for remedying the problems, for example, the following method for manufacturing a laminated ceramic capacitor has been proposed. More specifically, in this method for manufacturing a laminated ceramic capacitor, a laminate chip is manufactured in such a way that conductive films to serve as internal electrodes are printed in a striped shape onto ceramic green sheets, and the ceramic green sheets are stacked as required, subjected to pressure bonding, and then cut into one laminate chip. Then, in an insulator-section forming device 1 as shown in FIG. 7, on a horizontal metal plate 2, a coating film of a paste 3 for insulator sections is formed with the use of such a solvent that has no ability to dissolve the laminated body, while common ceramic materials are used for the laminate chips. Thereafter, the paste 3 for insulator sections is applied onto side surfaces of laminate chips 5 held by a holding plate 4 to form insulator sections on the laminate chips 5 (see Patent Document 1).

Patent Document 1: Japanese Patent Application Laid-Open No. S61-248413

SUMMARY OF THE INVENTION

However, as the paste for insulator sections, even when a solvent that is made of a common ceramic material to the laminated body and has no ability to dissolve the laminated body is used on the side surfaces of the laminate chip, in the case of applying the paste for insulator sections to the side surfaces of the laminate chip by the conventional method as described above, there are problems that the applied thickness is reduced on ridges of the laminate chip beyond the level in which the electronic properties are maintained and that the paste cannot be applied smoothly.

Therefore, a main object of the present invention is to provide a method for manufacturing a laminated ceramic electronic component, where insulator sections have a desired thickness on the side surfaces of a laminate chip, thereby making it possible to achieve a highly reliable laminated ceramic electronic component with stable electrical properties. Furthermore, another object of the present invention is to provide a method for manufacturing a laminated ceramic electronic component, which makes it possible to achieve a laminated ceramic electronic component which suppresses deterioration in the appearance quality thereof.

A method for manufacturing a laminated ceramic electronic component according to the present invention includes the steps of: preparing a laminate chip formed so that a plurality of ceramic layers and a plurality of internal electrodes are stacked, and both end edges of the internal electrodes are exposed at side surfaces; forming a first insulator section by applying a paste for insulator sections on one side surface of the laminate chip in such a way that more than one laminate chips are aligned, the one side surface of the laminate chip is pressed against a metal plate with any volume of grooves filled with the paste for insulator sections, which is composed of a ceramic paste, and the metal plate or the laminate chip is swung in any direction in pulling the laminate chip away from the metal plate; forming a second insulator section by applying the paste for insulator sections on the other side surface of the laminate chip in such a way that the other side surface of the laminate chip is pressed against a metal plate with any volume of grooves filled with the paste for insulator sections, and the metal plate or the laminate chip is swung in any direction in pulling the laminate chip away from the metal plate; and firing the laminate chip with the first insulator section and second insulator section formed, the paste for insulator sections is characterized in that the viscosity is 500 Pa·s to 2500 Pa·s, and the content C (vol %) of an inorganic solid content satisfies C≥(S×t/(V/2))×100, where C represents the content (vol %) of the inorganic solid content, t represents the guaranteed thickness (μm) of an insulating layer, S represents the area (μm$^2$) of a surface with the insulating layer formed thereon, and V represents the groove volume (μm$^3$) of the metal plate corresponding to one chip.

In addition, in the method for manufacturing a laminated ceramic electronic component according to the present invention, a solvent component constituting the paste for insulator sections is preferably immiscible in a binder component contained in the laminate chips.

In the method for manufacturing a laminated ceramic electronic component according to the present invention, because the viscosity of the paste for insulator sections is set at 500 Pa·s or more and 2500 Pa·s or less and the content of the ceramic raw material satisfies the formula mentioned above, a laminated ceramic electronic component can be manufactured while the insulator section is formed on the side surfaces of the laminate chip with reduced variation in applied thickness, without any abnormality such as horn-shaped projections in the applied shape, and furthermore, with the measured thickness not less than the guaranteed thickness. Therefore, the insulator sections have a desired thickness on the side surfaces of a laminate chip, thereby making it possible to achieve a highly reliable laminated ceramic electronic component with stable electrical properties.

In addition, the method for manufacturing a laminated ceramic electronic component according to the present invention can achieve a laminated ceramic electronic component with stable electrical properties, by the use of, as the paste solvent contained in the paste for insulator sections, a solvent that has no ability to dissolve the binder component forming the ceramic layers of the laminate chip.

The above-mentioned object, other objects, features, and advantages of the present invention will be further evident from the following description in the mode for carrying out the invention.

BRIEF EXPLANATION OF THE DRAWINGS

FIG. 3(a) is a prepared ceramic green sheet with strip-shaped conductive films printed thereon, FIG. 3(b) is a diagram illustrating a step of stacking first and second ceramic green sheets, and FIG. 3(c) is a perspective view schematically illustrating a laminated body.

FIG. 5(a) is a diagram of laminate chips brought into a grooved metal plate, FIG. 5(b) is a diagram of the laminate chips pressed against the grooved metal plate, and FIG. 5(c) is a diagram of the laminate chips pulled up from the grooved metal plate while swinging.

Figure 1:
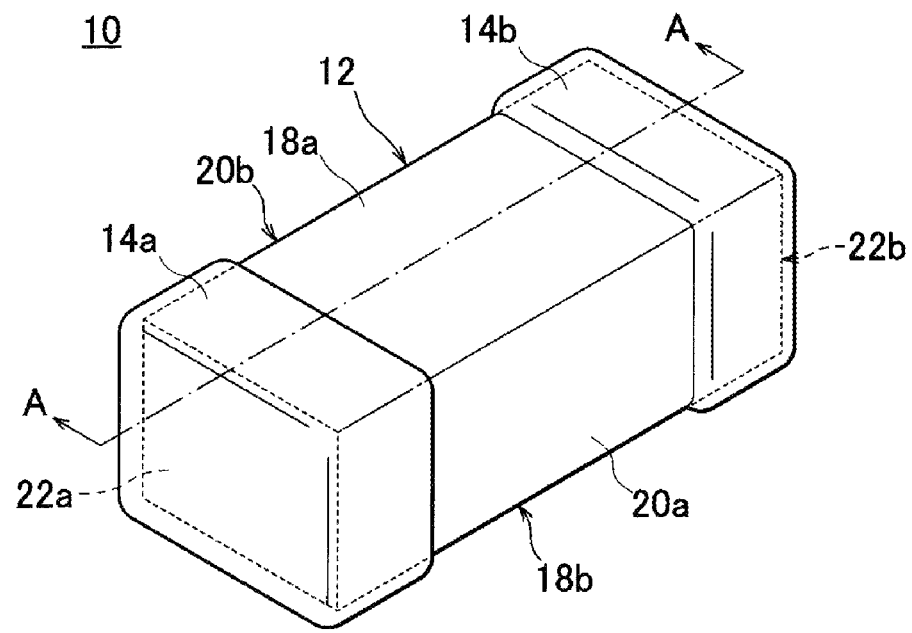
FIG. 1 is a perspective view schematically illustrating an example of the appearance of a laminated ceramic electronic component manufactured by a method for manufacturing a laminated ceramic electronic component according to the present invention.

DESCRIPTION OF REFERENCE SYMBOLS 10 laminated ceramic electronic component
12 ceramic body
14a, 14b external electrode
16a, 16b ceramic layer
18a one principal surface
18b other principal surface
20a one side surface
20b other side surface
22a one end surface
22b other end surface
24a, 24b internal electrode
26a, 26b opposed section
28a, 28b extraction electrode section
30a, 30b ceramic green sheet
32a, 32b conductive film
34a, 34b gap
36 laminated body
38 first cutting-plane line
40 second cutting-plane line
42 laminate chip
44a, 44b side-surface electrode
50 insulator-section forming device
52 grooved metal plate
52a groove section
54 paste for insulator sections
56 holding plate
56a main body section
56b holding section
60 laminate chip with insulator sections
62a first insulator section
62b second insulator section

DETAILED DESCRIPTION OF THE INVENTION

Figure 2:
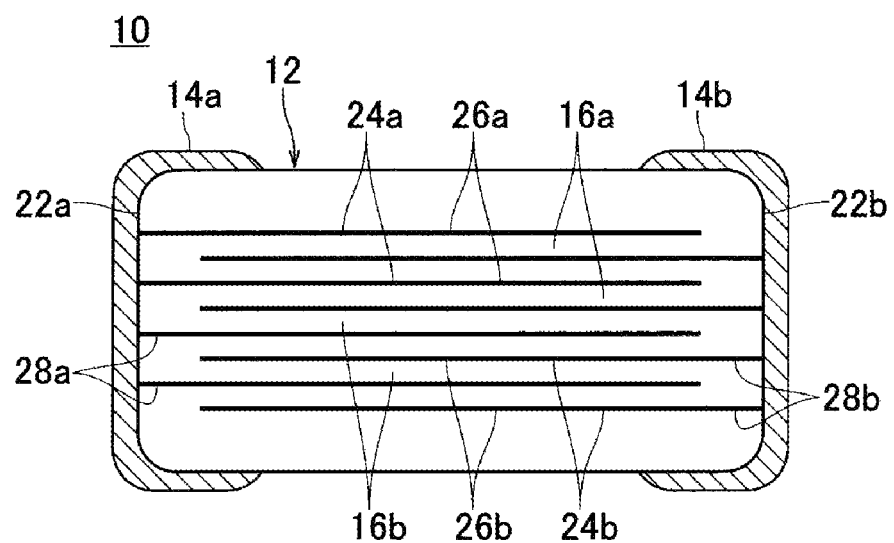
FIG. 2 is a cross-sectional view illustrating a cross section along the line A-A of the laminated ceramic electronic component manufactured by the method for manufacturing a laminated ceramic electronic component according to the invention.

An embodiment of a laminated ceramic electronic component will be described which is manufactured by a method for manufacturing a laminated ceramic electronic component according to the present invention. FIG. 1 shows a perspective view schematically illustrating a laminated ceramic electronic component as an example of the appearance of a laminated ceramic electronic component composed of a ceramic body and external electrodes, and FIG. 2 shows a cross-sectional view schematically illustrating a cross section along the line A-A of the laminated ceramic electronic component shown in FIG. 1.

The laminated ceramic electronic component 10 manufactured by a method for manufacturing a laminated ceramic electronic component according to the embodiment is composed of a ceramic body 12 and external electrodes 14a and 14b formed on the surface of the ceramic body 12.

The ceramic body 12 for use in the laminated ceramic electronic component 10 manufactured by a method for manufacturing a laminated ceramic electronic component according to the embodiment is composed of a plurality of ceramic layers 16a and 16b stacked. Further, the ceramic body 12, which is formed in a cuboidal shape, has one principal surface 18a and the other principal surface 18b extending in the length (L) direction and the width (W) direction, one side surface 20a and the other side surface 20b extending in the length (L) direction and the height (T) direction, and one end surface 22a and the other end surface 22b extending in the width (W) direction and the height (T) direction. The laminated ceramic electronic component 10 herein is required to have the one side surface 20a and other side surface 20b insulated with necessary capacitance ensured. It is to be noted that the ceramic body 12 preferably have corners and ridges rounded.

For the material of the ceramic layers 16a and 16b, for example, dielectric ceramics can be used which have a main constituent such as $BaTiO_3$, $CaTiO_3$, $SrTiO_3$, and $CaZrO_3$. In addition, these main constituents may be used with the addition of accessory constituents such as Mn compounds, Mg compounds, Si compounds, Co compounds, Ni compounds, and rare-earth compounds. Besides, piezoelectric ceramics such as PZT ceramics, semiconductor ceramics such as spinel ceramics, and the like can be also used.

It is to be noted that the ceramic body 12 according to the embodiment functions as a capacitor, because of the use of a dielectric ceramic.

The ceramic body 12 has a plurality of internal electrodes 24a and 24b so as to be sandwiched between the plurality of ceramic layers 16a and 16b. For the material of the internal electrodes 24a and 24b, for example, Ni, Cu, Ag, Pd, Ag—Pd alloys, Au, and the like can be used. The fired internal electrodes 28a and 28b are preferably 0.3 to 2.0 μm in thickness. In addition, the fired ceramic layers 16a and 16b are preferably 0.5 to 10 μm in thickness.

The internal electrode 24a has an opposed section 26a and an extraction electrode section 28b. The opposed section 26a is opposed to the internal electrode 24b. The extraction electrode section 28a is extracted from the opposed section 26a to the one end surface 22a of the ceramic body 12. Further, the extraction electrode section 28a of the internal electrode 24a has an extending end formed so as to be exposed at the one end surface 22a of the ceramic body 12.

Furthermore, the internal electrode 24b has, as in the case of the internal electrode 24a, an opposed section 26b opposed to the internal electrode 24a and an extraction electrode section 28b extracted from the opposed section 26b to the other end surface 22b of the ceramic body 12. The extraction electrode section 28b of the internal electrode 24b has an extending end formed so as to be exposed at the other end surface 22b of the ceramic body 12.

On the one end surface 22a of the ceramic body 12, an external electrode 14a is formed so as to be electrically connected to the internal electrodes 24a through the extraction electrode sections 28a, and cover the one end surface 22a and the internal electrodes 24a. Likewise, on the other end surface 22b of the ceramic body 12, an external electrode 14b is formed so as to be electrically connected to the internal electrodes 24b through the extraction electrode sections 28b, and cover the other end surface 22b and the internal electrodes 24b.

For the material of the external electrodes 14a and 14b, for example, Cu, Ni, Ag, Pd, Ag—Pd alloys, Au, and the like can be used. Among these materials, a base metal such as, for example, Cu or Ni is preferably used. The external electrodes 14a and 14b are preferably 10 to 80 μm in thickness.

Next, an embodiment will be described on the method for manufacturing a laminated ceramic electronic component according to the present invention. FIGS. 3(a) to 3(c) are diagrams schematically illustrating a process of manufacturing a laminate chip in the method for manufacturing a laminated ceramic electronic component according to one embodiment of the present invention. The method for manufacturing a laminated ceramic electronic component according to the present invention includes a process of printing stripe electrodes on a plurality of ceramic green sheets, stacking the sheets to form a laminated body, cutting the laminated body to create laminate chips with the electrodes exposed at side surfaces, and then pressing the laminate chips against a metal plate with any volume of grooves filled with a paste for insulator sections, thereby forming insulator sections on the laminate chips. The method will be described below in detail.

First, in the manufacture of the laminated ceramic electronic component 10, a ceramic material powder, a sintering aid, a binder, a plasticizer, etc. are mixed to form a ceramic slurry. From the ceramic slurry, ceramic green sheets are formed on carrier films with the use of, for example, a doctor blade method. Then, a plurality of ceramic green sheets 30a and 30b are prepared. For the binder component, for example, polyvinyl butyral is used. In addition, for the plasticizer, for example, dioctyl phthalate is used.

Subsequently, as shown in FIG. 3(a), on the surface of the ceramic green sheet 30a, a plurality of strip-shaped conductive films 32a are printed parallel to each other. In addition, on the surface of the ceramic green sheet 30b, a plurality of strip-shaped conductive films 32b are printed parallel to each other. A gap 34a is appropriately provided between the conductive films 32a, whereas a gap 34b is appropriately provided between the conductive films 32b. As a result, the conductive films 32a are formed in a stripe pattern on the surface of the ceramic green sheet 30a, whereas the conductive films 32b are formed in a stripe pattern on the surface of the ceramic green sheet 30b. Next, the conductive films 32a and 32b printed on the surfaces of the ceramic green sheets 30a and 30b are subjected to drying. It is to be noted that the conductive film 32a serves as the internal electrode 24a in the laminated ceramic electronic component 10, whereas the conductive film 32b serves as the internal electrode 24a in the laminated ceramic electronic component 10. The materials for the conductive films 32a and 32b contain a conductive component, a binder component, and a plasticizer. For example, Ni, Cu, Ag, Pd, an Ag—Pd alloy, Au, or the like is used for the conductive component. In addition, ethyl cellulose is used for the binder component. In addition, for the plasticizer, for example, alkyd is used.

Thereafter, as shown in FIG. 3(b), the ceramic green sheets 30a and 30b with the conductive films 32a and 32b printed in the stripe patters are stacked with alternate shifts by an amount required for ensuring at least the extraction electrode sections 28a and 28b of the internal electrodes 24a and 24b in a direction perpendicular to the printing directions of the conductive films 32a and 32b. If necessary, a predetermined number of ceramic green sheets with no conductive films formed are stacked on the upper surface and lower surface of the ceramic green sheets stacked as described. Then, the stacked ceramic green sheets are pressed for pressure bonding to each other to form a laminated body 38 including the conductive films 32a and 32b printed in the strip forms.

Then, as shown in FIG. 3(c), the laminated body 38 formed is cut along first cutting-plane lines 38 in the length (L) direction, and cut along second cutting-plane lines 40 in the width (W) direction to produce the laminate chips 42. In this case, in the laminate chips 42, the conductive films 32a serve as the internal electrodes 24a, whereas the conductive films 32b serve as the internal electrodes 24b.

Figure 3:
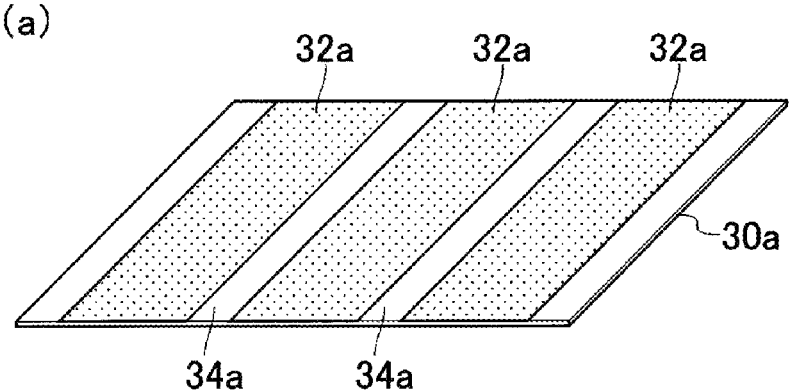
FIGS. 3(a) to 3(c) are diagrams schematically illustrating a process of manufacturing a laminate chip in the method for manufacturing a laminated ceramic electronic component according to the present invention, where
Figure 3:
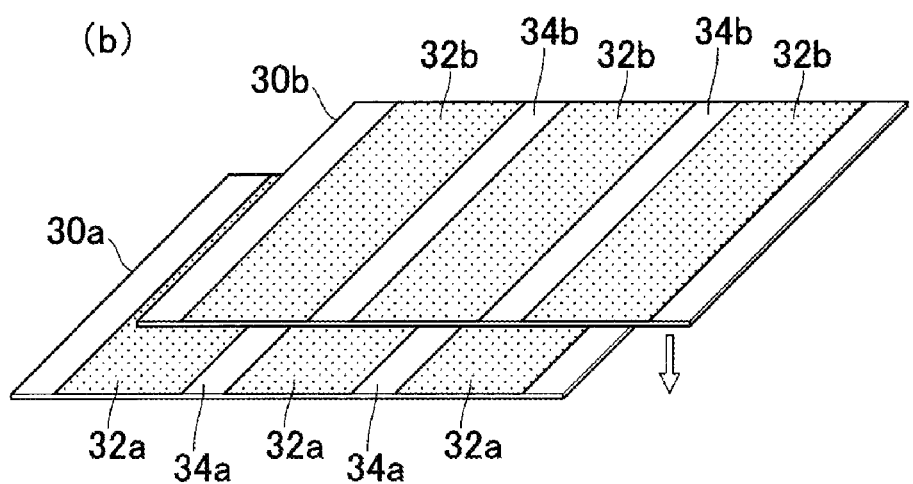
Figure 3:
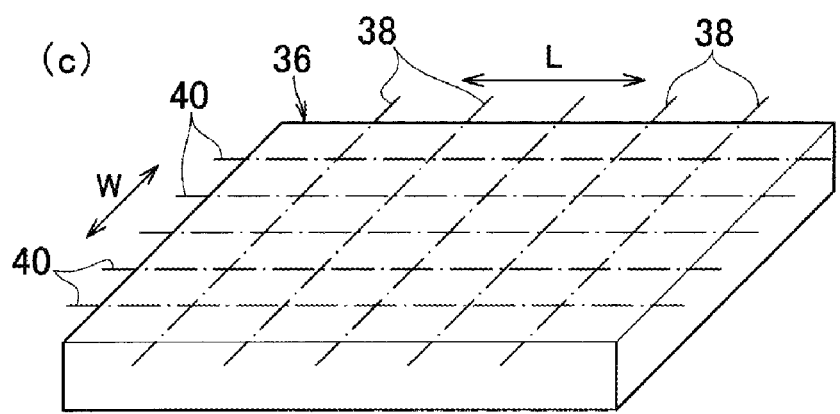
Figure 4:
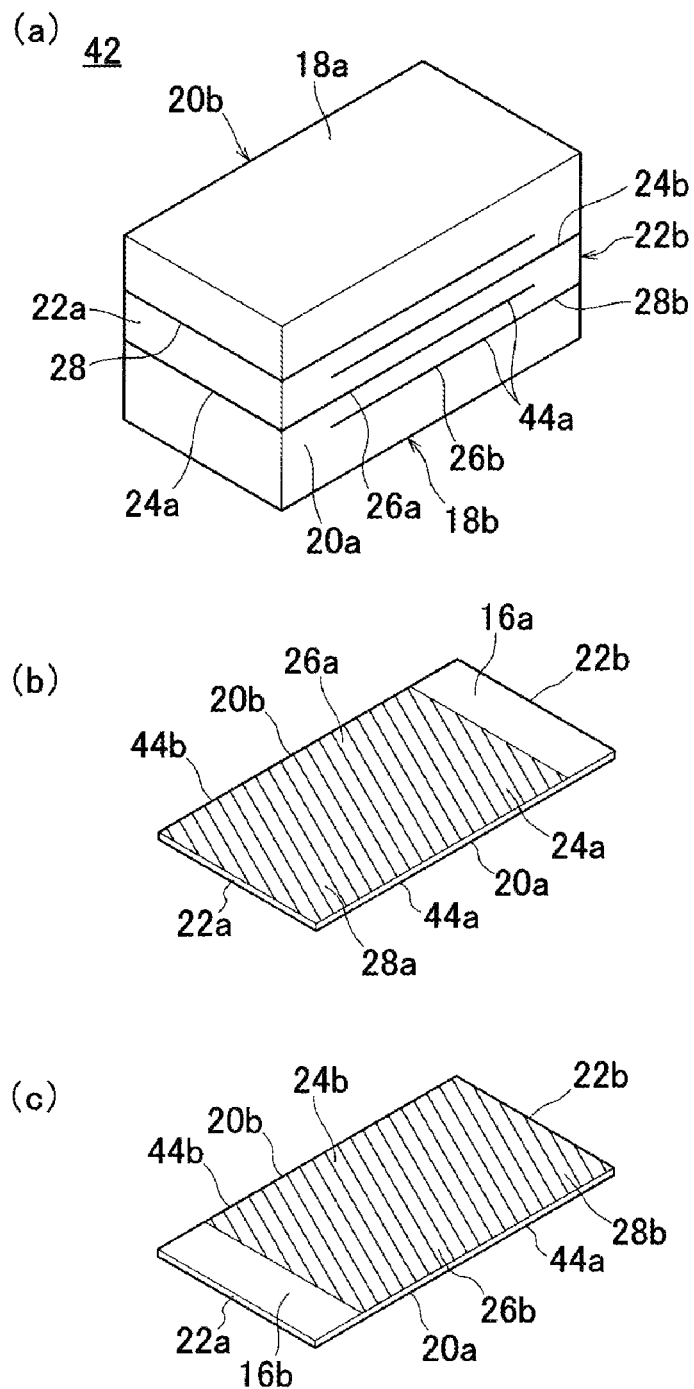
FIG. 4(a) is a perspective view schematically illustrating an example of the appearance of the laminate chip manufactured in accordance with the process for manufacturing laminate chips as shown in FIGS. 3(a) to 3(c), and FIGS. 4(b) and 4(c) are each a plane section view for explaining the shape of an internal electrode.

FIG. 4(a) is a perspective view schematically illustrating an example of the appearance of the laminate chip manufactured in accordance with the process for manufacturing laminate chips as shown in FIG. 3. The laminate chip 42 cut from the laminated body 38, which is formed in a cuboidal shape as in the case of the laminated ceramic electronic component 10, has one principal surface 18a and the other principal surface 18b extending in the length (L) direction and the width (W) direction, one side surface 20a and the other side surface 20b extending in the length (L) direction and the height (T) direction, and one end surface 22a and the other end surface 22b extending in the width (W) direction and the height (T) direction.

FIGS. 4(b) and 4(c) are each a plane section view for explaining the shape of an internal electrode. The laminate chip 42 has a plurality of internal electrodes 24a and 24b so as to be sandwiched between a plurality of ceramic layers 16a and 16b. Accordingly, the laminate chip 42 is composed of the plurality of ceramic layers 16a and 16b and internal electrodes 24a and 24b stacked.

As shown in FIG. 4(b), the internal electrode 24a has an opposed section 26a, an extraction electrode section 28a, a side-surface electrode 44a, and a side-surface electrode 44b. Further, the extraction electrode section 28a is extracted from the opposed section 26a to the one end surface 22a of the laminate chip 42. Further, the extraction electrode section 28a of the internal electrode 24a has an extending end formed so as to be exposed at the one end surface 22a of the laminate chip 42. In addition, the side-surface electrode 44a is exposed at the one side surface 20a of the laminate chip 42, whereas the side-surface electrode 44b is exposed at the other side surface 20b of the laminate chip 42.

Furthermore, as shown in FIG. 4(c), the internal electrode 24b has an opposed section 26b, an extraction electrode section 28b, a side-surface electrode 44a, and a side-surface electrode 44b. Further, the extraction electrode section 28b is extracted from the opposed section 26b to the other end surface 22b of the laminate chip 42. Further, the extraction electrode section 28b of the internal electrode 24b has an extending end formed so as to be exposed at the other end surface 22b of the laminate chip 42. In addition, the side-surface electrode 44a is exposed at the one side surface 20a of the laminate chip 42, whereas the side-surface electrode 44b is exposed at the other side surface 20b of the laminate chip 42.

Next, a process for forming insulator sections on the laminate chip will be described. In this process, a paste for insulator sections is applied to the one side surface 20a and other side surface 20b of the laminate chip 42 manufactured by the method described above, in order to cover the exposed side-surface electrodes 44a and 44b. First, an insulator-section forming device 50 will be described which is used in the process of applying a paste for insulator sections to the laminate chip 42.

As shown in FIG. 5(a), the insulator-section forming device 50 includes a grooved metal plate 52, a paste 54 for insulator sections, and a holding plate 56. The insulator-section forming device 50 additionally includes, although not shown, a squeegee for filling the grooved metal plate 52 with the paste 54 for insulator sections, and a holding-plate swinging/moving mechanism for swinging or moving the holding plate 56 with the laminate chips 42 held in any manner such as in vertical and horizontal directions.

The insulator-section forming device 50 is a device for manufacturing laminate chips with insulator sections, in such a way that, while grooves formed in the grooved metal plate 52 are filled by squeegee operation with the paste 54 for insulator sections, and the laminate chips 42 are dipped in the grooved metal plate 50 filled with the paste 54 for insulator sections to form the insulator sections.

The grooved metal plate 52 is provided to supply the paste 54 for insulator sections for application to the laminate chips 42. The grooved metal plate 52 is obtained by forming a plurality of grooves 52a in a metal plate. The grooves 52a are formed in a cuboidal concave shape. The grooves 52a are formed in a grid-like pattern in a crossing direction with respect to the length direction of the laminate chip 42. In addition, the volume of the grooves 52a is determined on the basis of the area of the side surface of the laminate chip 42 to which the paste 54 for insulator sections is to be applied.

The paste 54 for insulator sections is used for forming insulator sections on the laminate chips 42. The material for the paste 54 for insulator sections contains a binder component, a ceramic raw material, a plasticizer, and a paste solvent.

For the binder component, for example, polyvinyl butyral, ethyl cellulose, and cellulose butyrate acetate are used. $BaTiO_3$, $CaTiO_3$, $SrTiO_3$, $CaZrO_3$, and the like are used for the ceramic raw material. For the plasticizer, for example, dioctyl phthalate is used.

The paste 54 used for insulator sections has the following features. More specifically, the viscosity of the paste 54 for insulator sections can be changed by changing the type of the binder component mentioned above, the molecular weight of each binder component, the content of the ceramic raw material as an inorganic solid content, and the volume fraction of the ceramic. In an embodiment according to the present invention, the binder component mentioned above is contained so that the viscosity of the paste 54 for insulator sections at 25° C. is 500 Pa·s or more and 2500 Pa·s or less. In the lower-viscosity region, the insulator section is reduced in thickness on ridges of the laminate chip 42, because the paste 54 for insulator sections is more likely to flow. On the other hand, in the higher-viscosity region, the shape immediately after the application is maintained to cause abnormality in the shape of the insulator section, because the paste 54 for insulator sections is less likely to flow. It is to be noted that the viscosity of the paste for insulator sections at 25° C. is measured at a shear rate of 0.2 (1/s) with the use of a cone of 3°×R9.7 mm in a cone-plate rotary viscometer.

In addition, the content of the ceramic raw material as an inorganic solid content to be contained in the paste 54 for insulator sections needs to satisfy the following formula 1.

$$C \geq (S \times t / (V/2)) \times 100 \qquad \text{[Formula 1]}$$

In the formula, C represents the content (vol %) of the ceramic raw material, t represents the guaranteed thickness (μm) of a first insulator section 62a or a second insulator section 62b, S represents the area (μm$^2$) of a surface with the first insulator section 62a or second insulator section 62b formed thereon, and V represents the groove volume (μm$^3$) in the grooves 52a of the grooved metal plate 52, which correspond to one of the laminate chips 40. It is to be noted that the guaranteed thickness refers to a target thickness for an insulator section formed on the side surface of the laminate chip.

More specifically, when the grooved metal plate 52 is used, the paste 54 for insulator sections that corresponds to ½ or more of the spatial volume of the grooves corresponding to one of the laminate chips 42 is applied to the laminate chip 42. Accordingly, the content of the ceramic raw material in the paste 54 for insulator sections for the achievement of a desired guaranteed thickness is determined on the basis of the guaranteed thickness, the groove volume, and the area of the surface to be formed with the first insulator section 62a or second insulator section 62b.

In addition, for the paste solvent contained in the paste 54 for insulator sections, a solvent having no ability to dissolve the binder component forming the ceramic layers 16a and 16b of the laminate chip 42 is used. This is because, when the solvent has an ability to dissolve the binder component forming the ceramic layers 16a and 16b of the laminate chip 42, damage will be caused to the laminate chip 42 to cause short-circuit defects. For example, for the paste solvent contained in the paste 54 for insulator sections, a paste solvent immiscible in the binder component contained in the laminate chip 42 is preferably used, in relation to the paste solvent used for the ceramic green sheets 30a and 30b. For the paste solvent, for example, dihydroterpineol acetate is used.

The holding plate 56 is provided for moving the laminate chips 42 so as to be dipped in the grooved metal plate 52 by controlling the holding-plate swinging/moving mechanism under a dipping condition with the laminate chips 42 held.

The holding plate 56 is composed of a main body section 56a and a holding section 56b. The one side surface 20a or other side surface 20b of the laminate chip 42 is held by the holding section 56b. For the holding section 56b, an adhesive rubber is used, for example. In addition, on the holding section 56b, the laminate chips 42 are arranged in an array of, for example, 45 columns×22 rows. When the other side surfaces 20b of the laminate chips 42 are held by the holding plate 56, the holding plate 56 is controlled by the holding-plate swinging/moving mechanism such that the one side surfaces 20a of the laminate chips 42 are pressed against the grooved metal plate 52 and thereby dipped in the paste 54 for insulator sections, and that the laminate chips 42 are swung in any manner in vertical and horizontal directions in pulling away from the grooved metal plate 52. Likewise, when the one side surfaces 20a of the laminate chips 42 are held by the holding plate 56, the holding plate 56 is controlled by the holding-plate swinging/moving mechanism such that the other side surfaces 20b of the laminate chips 42 are pressed against the grooved metal plate 52 and thereby dipped in the paste 54 for insulator sections, and that the laminate chips 42 are swung in any manner in vertical and horizontal directions in pulling away from the grooved metal plate 52.

Next, a step of applying a paste for insulator sections to a laminate chip in a method for manufacturing a laminated ceramic electronic component will be described with reference to FIGS. 5(a) to 5(c). FIGS. 5(a) to 5(c) are diagrams schematically illustrating a step of applying a paste for insulator sections to a laminate chip in a method for manufacturing a laminated ceramic electronic component according to an embodiment of the present invention.

First, as shown in FIG. 5(a), the grooves 52a of the grooved metal plate 52 are filled with the paste 54 for insulator sections with the use of a squeegee. As shown in FIG. 5(b), next, with the other side surfaces 20b of the plurality of laminate chips 42 held by the holding plate 56 as described above, the one side surfaces 20a of the laminate chips 42 are pressed against the grooves 52a of the grooved metal plate 54, which are filled with the paste 54 for insulator sections. Then, as shown in FIG. 5(c), in pulling the laminate chips 42 away from the grooved metal plate 52, the laminate chips 42 are swung in any manner in vertical and horizontal directions to spread the paste 54 for insulator sections over the one side surfaces 20a of the laminate chips 42.

Furthermore, in accordance with the same step as the described step of applying the paste 54 for insulator sections to the one side surfaces 20a of the laminate chips 42 in FIGS. 5(a) to 5(c), the paste 54 for insulator sections is also applied to the other side surfaces 20b of the laminate chips 42. As a result, the second insulator section 62b is formed on the other side surface 20b. Then, a laminate chip 60 with the insulator sections is produced.

Figure 5:
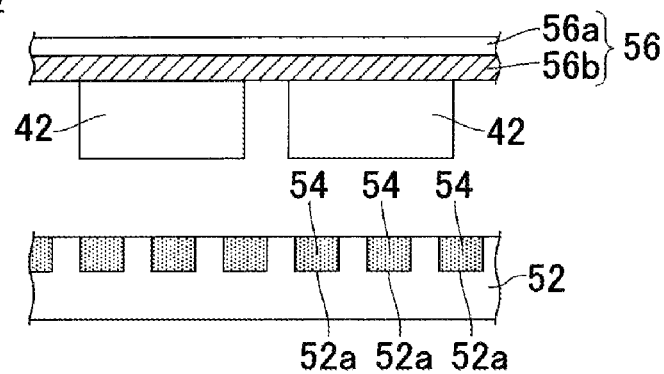
FIGS. 5(a) to 5(c) are diagrams schematically illustrating a step of applying a paste for insulator sections to a laminate chip in a method for manufacturing a laminated ceramic electronic component according to the present invention.
Figure 5:
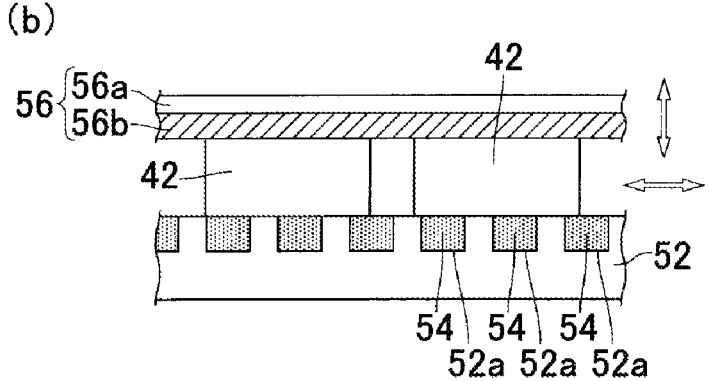
Figure 5:
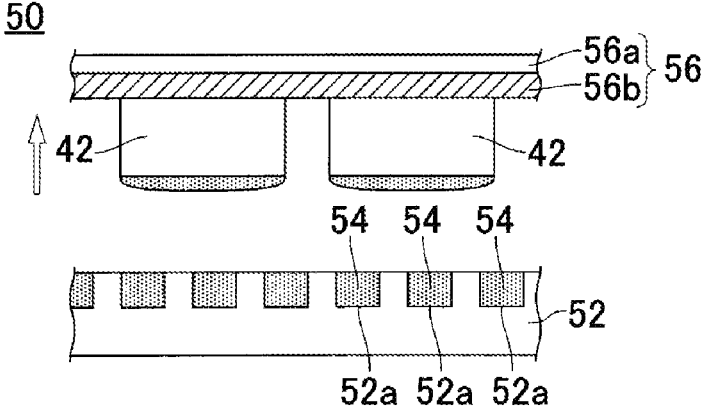
Figure 6:
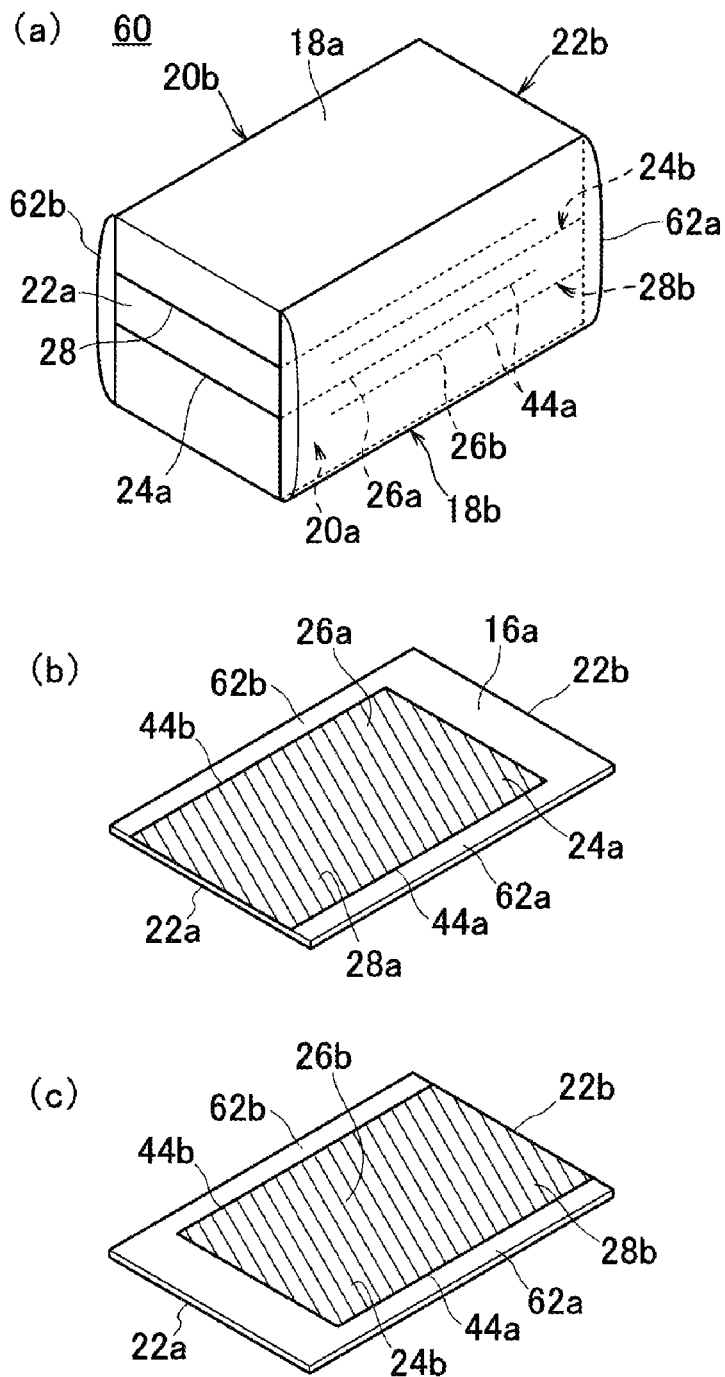
FIG. 6(a) is a perspective view schematically illustrating an example of the appearance of a laminate chip with insulator sections produced in accordance with the step of applying the paste for insulator sections to the laminate chips as shown in FIGS. 5(a) to 5(c), and FIGS. 6(b) and 6(c) are each a plane section view for explaining the shape of an internal electrode.
Figure 7:
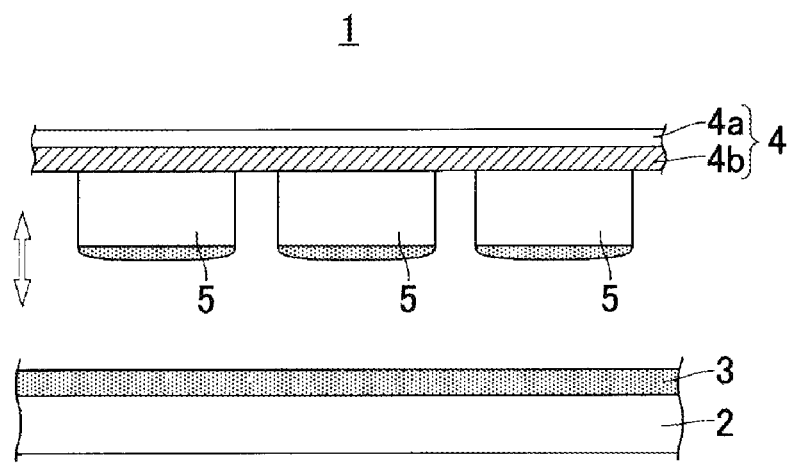
FIG. 7 is a diagram schematically illustrating a step of applying a paste for insulator sections to a laminate chip in a conventional method for manufacturing a laminated ceramic electronic component.

FIG. 6(a) is a perspective view schematically illustrating an example of the appearance of a laminate chip with insulator sections produced in accordance with the step of applying the paste for insulator sections to the laminate chips as shown in FIG. 5.

The laminate chip 60 with insulator sections manufactured by the manufacturing method described above, which is formed in a cuboidal shape, as in the case of the laminated ceramic electronic component 10 or the laminate chip 42, has one principal surface 18a and the other principal surface 18b extending in the length (L) direction and the width (W) direction, one side surface 20a and the other side surface 20b extending in the length (L) direction and the height (T) direction, and one end surface 22a and the other end surface 22b extending in the width (W) direction and the height (T) direction.

FIGS. 6(b) and 6(c) are each a plane section view for explaining the shape of an internal electrode. The laminate chip 60 with the insulator sections has a plurality of internal electrodes 24a and 24b so as to be sandwiched between a plurality of ceramic layers 16a and 16b.

As shown in FIG. 6(b), the internal electrode 24a has an opposed section 26a, an extraction electrode section 28a, a side-surface electrode 44a, and a side-surface electrode 44b. Further, the extraction electrode section 28a is extracted from the opposed section 26a to the one end surface 22a of the laminate chip 42. Further, the extraction electrode section 28a of the internal electrode 24a has an extending end formed so as to be exposed at the one end surface 22a of the laminate chip 42. On the other hand, the side-surface electrode 44a is covered with the first insulator section 62a with a desired width, whereas the side-surface electrode 44b is covered with the second insulator section 62b with a desired width.

Furthermore, as shown in FIG. 6(c), the internal electrode 24b has an opposed section 26b, an extraction electrode section 28b, a side-surface electrode 44a, and a side-surface electrode 44b. Further, the extraction electrode section 28b is extracted from the opposed section 26b to the other end surface 22b of the laminate chip 42. Further, the extraction electrode section 28b of the internal electrode 24b has an extending end formed so as to be exposed at the other end surface 22b of the laminate chip 42. On the other hand, the side-surface electrode 44a is covered with the first insulator section 62a with a desired width, whereas the side-surface electrode 44b is covered with the second insulator section 62b with a desired width.

Subsequently, the laminate chip 60 with the insulator sections, which is manufactured in accordance with the step described above, is subjected to firing. Then, a conductive paste is applied to the one end surface 22a and other end surface 22b of the fired laminate chip 60 with the insulator sections, and the laminate chip 60 with the insulator sections, with the conductive paste applied thereto, is subjected to baking. Thus, the external electrodes 14a and 14b are respectively formed on the one end surface 22a and other end surface 22b, thereby producing a laminated ceramic electronic component.

In the method for manufacturing a laminated ceramic electronic component according to the present invention, because the viscosity of the paste for insulator sections is set at 500 Pa·s or more and 2500 Pa·s or less and the content of the ceramic raw material satisfies a predetermined condition, a laminated ceramic electronic component can be manufactured while the insulator section is formed on the side surfaces of the laminate chip 42 with reduced variation in applied thickness, without any abnormality such as horn-shaped projections in the applied shape, and furthermore, with the measured thickness not less than the guaranteed thickness. Therefore, the insulator sections have a desired thickness on the side surfaces of the laminate chip 42, thereby making it possible to achieve a highly reliable laminated ceramic electronic component with stable electrical properties. Furthermore, in the method for manufacturing a laminated ceramic electronic component according to the present invention, a laminated ceramic electronic component in which deterioration in appearance quality is suppressed can be achieved.

In addition, in the method for manufacturing a laminated ceramic electronic component according to the present invention, the damage caused by the paste agent to the main body of the laminate chip 40 can be eliminated, because the paste agent which is immiscible in the laminate chip 42 is used for the paste 54 for insulator sections.

Example 1

Subsequently, an example will be described on the method for manufacturing a laminated ceramic electronic component according to the present invention. The method for manufacturing a laminated ceramic electronic component according to Example 1 is a method of manufacturing a laminated ceramic electronic component by printing an electrode in a stripe pattern on a plurality of ceramic green sheets, stacking the ceramic green sheets, cutting the stacked ceramic green sheets to create laminate chips with side-surface electrodes exposed, and then pressing the laminate chips against a grooved metal plate with any volume of grooves filled with a paste for insulator sections.

In Example 1, pastes for insulator sections were manufactured by way of trial, in such a way that the viscosity of the paste for insulator section was changed by changing the type of the binder, the molecular weight of the binder, the content of the ceramic raw material, and the volume fraction of the ceramic. Each paste for insulator sections was used to form insulator sections on the side surfaces of the laminate chips, by dipping the laminate chips to the grooved metal plate, and pulling up the laminate chips while swinging the laminate chips in any manner in vertical and horizontal directions. Then, the thickness variation of the insulator section and the shape of the insulator section were checked for each laminate chip. In addition, the relationship between the content of the ceramic raw material and the thickness of the insulator section was checked by changing the spatial volume of the grooved metal plate. The results are shown in Tables 1 and 2 as well as Tables 3 and 4. Further, experimental conditions according to Example 1 are as follows.

Experimental Condition
Size of Laminate Chip: L 1.0 mm×W 0.5 mm×T 0.5 mm
The Number of Laminate Chips: 990 (arrangement of 45 columns×22 rows on adhesive rubber)
Arrangement Interval for laminate chips: 1.0 mm (column-to-column), 2.0 mm (row-to-row)
Organic Component for Laminate Chip
Dielectric Layer:
(Binder Component): Mainly, polyvinyl butyral
(Plasticizer): Dioctyl phthalate
Internal Electrode (Conductive Film)
(Binder Component): Ethyl cellulose
(Plasticizer): Alkyd
Organic Component of Paste for Insulator Sections
(Binder Component): Polyvinyl butyral, Ethyl cellulose, Cellulose butyrate acetate
(Plasticizer): Dioctyl phthalate
(Solvent): Dihydroterpinyl acetate
Spatial Volume of Grooved Metal Plate (Spatial Volume of Grooves corresponding to one laminate chip):
1.0 mm×1.0 mm×0.05 mm, 1.0 mm×1.0 mm×0.10 mm
1.0 mm×1.0 mm×0.15 mm, 1.0 mm×1.0 mm×0.20 mm
Further, details of the binder type and molecular weight of the binder component in the composition of the paste for insulator sections are as follows.
Polyvinyl butyral: Weight Average Molecular Weight Mw: 25000
Ethyl cellulose A: Weight Average Molecular Weight Mw: 35000
Ethyl cellulose B: Weight Average Molecular Weight Mw: 11000
Cellulose acetate butyrate A: Weight Average Molecular Weight Mw: 20000
Cellulose acetate butyrate B: Weight Average Molecular Weight Mw: 11000
Cellulose acetate butyrate C: Weight Average Molecular Weight Mw: 4000

The paste viscosity of the paste for insulator sections was measured at a shear rate of 0.2 (1/s) with the use of a cone of 3°×R9.7 mm in a cone-plate rotary viscometer. Detailed conditions for the viscosity measurement are as follows.
Viscometer: Viscometer TV-30 from Toki Sangyo Co., Ltd.
Cone Plate Type: TV-30H
Cone Rotor Name: 3°×R9.7
Measurement Sample Amount: 0.2 ml
Measurement Temperature: 25° C.
Rotation Speed: 0.1 rpm
Measurement Time: 60 seconds (the viscosity measured after 60 seconds from the start of viscometer rotation)

TABLE 1

| | Paste Composition | | | | | | | | Chip Properties |
|---|---|---|---|---|---|---|---|---|---|
| | Binder Component | | | | | Content C of Ceramic Raw Material | | | Side Surface Area S |
| | | Ethyl Cellulose | | Cellulose Acetate Butyrate | | | | | |
| Sample Number | Polyvinyl Butyral | A | B | A | B | C | (vol %) | PVC (vol %) | Viscosity (Pa·s) | ($\mu m^2$) |
| *1 | 47 | 0 | 0 | 0 | 0 | 53 | 35.0 | 70.1 | 430 | 500000 |
| 2 | 47 | 0 | 0 | 0 | 18 | 35 | 35.0 | 70.1 | 500 | 500000 |
| 3 | 47 | 0 | 0 | 0 | 53 | 0 | 35.0 | 69.6 | 530 | 500000 |
| 4 | 47 | 0 | 0 | 0 | 35 | 18 | 35.0 | 70.1 | 570 | 500000 |
| 5 | 47 | 0 | 0 | 0 | 53 | 0 | 35.0 | 70.1 | 730 | 500000 |
| 6 | 47 | 0 | 0 | 18 | 35 | 0 | 35.0 | 70.1 | 1090 | 500000 |
| 7 | 47 | 0 | 0 | 0 | 53 | 0 | 35.0 | 70.0 | 1150 | 500000 |
| 8 | 29 | 0 | 0 | 0 | 71 | 0 | 35.0 | 60.0 | 1450 | 500000 |
| 9 | 47 | 0 | 0 | 35 | 18 | 0 | 35.0 | 70.1 | 1500 | 500000 |
| 10 | 19 | 0 | 0 | 0 | 0 | 81 | 35.0 | 50.0 | 2470 | 500000 |
| *11 | 47 | 0 | 0 | 53 | 0 | 0 | 35.0 | 70.1 | 2680 | 500000 |
| *12 | 24 | 0 | 0 | 0 | 76 | 0 | 35.0 | 55.0 | 2860 | 500000 |
| *13 | 19 | 0 | 0 | 0 | 20 | 61 | 35.0 | 50.0 | 3490 | 500000 |
| *14 | 19 | 0 | 0 | 0 | 40 | 41 | 35.0 | 50.0 | 5240 | 500000 |
| *15 | 19 | 0 | 0 | 0 | 81 | 0 | 35.0 | 50.0 | 5530 | 500000 |
| *16 | 19 | 0 | 0 | 0 | 60 | 21 | 35.0 | 50.0 | 5820 | 500000 |

TABLE 1-continued

| Sample Number | | | | | | | | | | |
|---|---|---|---|---|---|---|---|---|---|---|
| *17 | 19 | 0 | 0 | 0 | 81 | 0 | 35.0 | 50.0 | 6920 | 500000 |
| *18 | 47 | 0 | 0 | 0 | 53 | 0 | 22.5 | 69.6 | 80 | 500000 |
| *19 | 47 | 0 | 53 | 0 | 0 | 0 | 22.5 | 69.6 | 420 | 500000 |
| *20 | 47 | 53 | 0 | 0 | 0 | 0 | 22.5 | 69.6 | 2500 | 500000 |
| 21 | 47 | 53 | 0 | 0 | 0 | 0 | 22.5 | 69.6 | 2500 | 500000 |
| 22 | 47 | 53 | 0 | 0 | 0 | 0 | 22.5 | 69.6 | 2500 | 500000 |
| 23 | 47 | 53 | 0 | 0 | 0 | 0 | 22.5 | 69.6 | 2500 | 500000 |
| *24 | 47 | 0 | 0 | 0 | 53 | 0 | 25.0 | 69.6 | 100 | 500000 |
| *25 | 19 | 0 | 0 | 0 | 0 | 81 | 25.0 | 50.0 | 470 | 500000 |
| *26 | 100 | 0 | 0 | 0 | 0 | 0 | 25.0 | 50.0 | 650 | 500000 |
| 27 | 100 | 0 | 0 | 0 | 0 | 0 | 25.0 | 50.0 | 650 | 500000 |
| 28 | 100 | 0 | 0 | 0 | 0 | 0 | 25.0 | 50.0 | 650 | 500000 |
| 29 | 100 | 0 | 0 | 0 | 0 | 0 | 25.0 | 50.0 | 650 | 500000 |

| | | Properties of Insulator Section | | | | |
|---|---|---|---|---|---|---|
| | | | | | Guaranteed Thickness T = 20 μm | |
| Sample Number | Metal Plate Groove Spatial Volume V (μm³) | Thickness Variation (%) − | Thickness Variation (%) + | Horn Shape | Measured Thickness t (μm) | Required Amount of Ceramic Raw Material: (S · T/(V/2)) · 100 | Measured Thickness − Guaranteed Thickness |
| *1 | 100000000 | 54 | 18 | ○ | 35.5 | 20 | 15.5 |
| 2 | 100000000 | 46 | 19 | ○ | 35.3 | 20 | 15.3 |
| 3 | 100000000 | 44 | 19 | ○ | 35.4 | 20 | 15.4 |
| 4 | 100000000 | 46 | 21 | ○ | 35.4 | 20 | 15.4 |
| 5 | 100000000 | 36 | 22 | ○ | 35.2 | 20 | 15.2 |
| 6 | 100000000 | 21 | 24 | ○ | 35.4 | 20 | 15.4 |
| 7 | 100000000 | 22 | 23 | ○ | 35.4 | 20 | 15.4 |
| 8 | 100000000 | 21 | 32 | ○ | 35.2 | 20 | 15.2 |
| 9 | 100000000 | 20 | 33 | ○ | 35.4 | 20 | 15.4 |
| 10 | 100000000 | 21 | 43 | ○ | 35.2 | 20 | 15.2 |
| *11 | 100000000 | 18 | 55 | ○ | 35.2 | 20 | 15.2 |
| *12 | 100000000 | 19 | 100 | X | 35.4 | 20 | 15.4 |
| *13 | 100000000 | 20 | 124 | X | 35.5 | 20 | 15.5 |
| *14 | 100000000 | 22 | 151 | X | 35.6 | 20 | 15.6 |
| *15 | 100000000 | 26 | 179 | X | 35.2 | 20 | 15.2 |
| *16 | 100000000 | 21 | 156 | X | 35.4 | 20 | 15.4 |
| *17 | 100000000 | 21 | 177 | X | 35.6 | 20 | 15.6 |
| *18 | 100000000 | 86 | 22 | ○ | 22.8 | 20 | 2.8 |
| *19 | 100000000 | 57 | 19 | ○ | 22.9 | 20 | 2.9 |
| *20 | 50000000 | 20 | 47 | ○ | 11.8 | 40 | −8.2 |
| 21 | 100000000 | 21 | 47 | ○ | 22.9 | 20 | 2.9 |
| 22 | 150000000 | 19 | 46 | ○ | 34.1 | 13 | 14.1 |
| 23 | 200000000 | 20 | 46 | ○ | 45.2 | 10 | 25.2 |
| *24 | 100000000 | 84 | 20 | ○ | 25.4 | 20 | 5.4 |
| *25 | 100000000 | 52 | 19 | ○ | 25.2 | 20 | 5.2 |
| *26 | 50000000 | 40 | 24 | ○ | 12.7 | 40 | −7.3 |
| 27 | 100000000 | 41 | 22 | ○ | 25.2 | 20 | 5.2 |
| 28 | 150000000 | 41 | 23 | ○ | 37.9 | 13 | 17.9 |
| 29 | 200000000 | 40 | 21 | ○ | 50.4 | 10 | 30.4 |

TABLE 2

| | Paste Composition | | | | | | | | Chip Properties |
|---|---|---|---|---|---|---|---|---|---|
| | Binder Component | | | | | Content C of | | | |
| Sample Number | Polyvinyl Butyral | Ethyl Cellulose A | Ethyl Cellulose B | Cellulose Acetate Butyrate A | Cellulose Acetate Butyrate B | Cellulose Acetate Butyrate C | Ceramic Raw Material (vol %) | PVC (vol %) | Viscosity (Pa·s) | Side Surface Area S (μm²) |
| *30 | 47 | 0 | 0 | 0 | 53 | 0 | 27.5 | 69.6 | 140 | 500000 |
| *31 | 19 | 0 | 0 | 0 | 0 | 81 | 27.5 | 50.0 | 780 | 500000 |
| 32 | 19 | 0 | 0 | 0 | 0 | 81 | 27.5 | 50.0 | 780 | 500000 |
| 33 | 19 | 0 | 0 | 0 | 0 | 81 | 27.5 | 50.0 | 780 | 500000 |
| 34 | 19 | 0 | 0 | 0 | 0 | 81 | 27.5 | 50.0 | 780 | 500000 |
| *35 | 47 | 0 | 0 | 0 | 53 | 0 | 30.0 | 69.6 | 160 | 500000 |
| *36 | 19 | 0 | 0 | 0 | 0 | 81 | 30.0 | 50.0 | 1060 | 500000 |

TABLE 2-continued

| | | | | | | | | | | |
|---|---|---|---|---|---|---|---|---|---|---|
| 37 | 19 | 0 | 0 | 0 | 0 | 81 | 30.0 | 50.0 | 1060 | 500000 |
| 38 | 19 | 0 | 0 | 0 | 0 | 81 | 30.0 | 50.0 | 1060 | 500000 |
| 39 | 19 | 0 | 0 | 0 | 0 | 81 | 30.0 | 50.0 | 1060 | 500000 |
| *40 | 19 | 0 | 0 | 0 | 0 | 81 | 32.5 | 50.0 | 2130 | 500000 |
| 41 | 19 | 0 | 0 | 0 | 0 | 81 | 32.5 | 50.0 | 2130 | 500000 |
| 42 | 19 | 0 | 0 | 0 | 0 | 81 | 32.5 | 50.0 | 2130 | 500000 |
| 43 | 19 | 0 | 0 | 0 | 0 | 81 | 32.5 | 50.0 | 2130 | 500000 |
| *44 | 47 | 0 | 0 | 0 | 53 | 0 | 35.0 | 70.0 | 1150 | 500000 |
| 45 | 47 | 0 | 0 | 0 | 53 | 0 | 35.0 | 70.0 | 1150 | 500000 |
| 46 | 47 | 0 | 0 | 0 | 53 | 0 | 35.0 | 70.0 | 1150 | 500000 |
| *47 | 47 | 0 | 0 | 0 | 53 | 0 | 37.5 | 69.6 | 960 | 500000 |
| 48 | 47 | 0 | 0 | 0 | 53 | 0 | 37.5 | 69.6 | 960 | 500000 |
| 49 | 47 | 0 | 0 | 0 | 53 | 0 | 37.5 | 69.6 | 960 | 500000 |
| 50 | 47 | 0 | 0 | 0 | 53 | 0 | 37.5 | 69.6 | 960 | 500000 |
| 51 | 47 | 0 | 0 | 0 | 53 | 0 | 40.0 | 69.6 | 1170 | 500000 |
| 52 | 47 | 0 | 0 | 0 | 53 | 0 | 40.0 | 69.6 | 1170 | 500000 |
| 53 | 47 | 0 | 0 | 0 | 53 | 0 | 40.0 | 69.6 | 1170 | 500000 |
| 54 | 47 | 0 | 0 | 0 | 53 | 0 | 40.0 | 69.6 | 1170 | 500000 |
| 55 | 47 | 0 | 0 | 0 | 53 | 0 | 42.5 | 69.6 | 1760 | 500000 |
| 56 | 47 | 0 | 0 | 0 | 53 | 0 | 42.5 | 69.6 | 1760 | 500000 |
| 57 | 47 | 0 | 0 | 0 | 53 | 0 | 42.5 | 69.6 | 1760 | 500000 |
| 58 | 47 | 0 | 0 | 0 | 53 | 0 | 42.5 | 69.6 | 1760 | 500000 |

| | Properties of Insulator Section | | | | | | |
|---|---|---|---|---|---|---|---|
| | | | | | | Guaranteed Thickness $T = 20 \ \mu m$ | |
| Sample Number | Metal Plate Groove Spatial Volume V ($\mu m^3$) | Thickness Variation (%) − | Thickness Variation (%) + | Horn Shape | Measured Thickness t ($\mu m$) | Required Amount of Ceramic Raw Material: $(S \cdot T/(V/2)) \cdot 100$ | Measured Thickness − Guaranteed Thickness |
| *30 | 100000000 | 79 | 20 | ○ | 28.1 | 20 | 8.1 |
| *31 | 50000000 | 30 | 25 | ○ | 14.2 | 40 | −5.8 |
| 32 | 100000000 | 32 | 23 | ○ | 27.7 | 20 | 7.7 |
| 33 | 150000000 | 32 | 24 | ○ | 41.5 | 13 | 21.5 |
| 34 | 200000000 | 33 | 22 | ○ | 55.6 | 10 | 35.6 |
| *35 | 100000000 | 68 | 16 | ○ | 30.4 | 20 | 10.4 |
| *36 | 50000000 | 27 | 24 | ○ | 15.4 | 40 | −4.6 |
| 37 | 100000000 | 25 | 22 | ○ | 30.6 | 20 | 10.6 |
| 38 | 150000000 | 24 | 22 | ○ | 45.2 | 13 | 25.2 |
| 39 | 200000000 | 24 | 21 | ○ | 60.4 | 10 | 40.4 |
| *40 | 50000000 | 20 | 41 | ○ | 16.6 | 40 | −3.4 |
| 41 | 100000000 | 18 | 42 | ○ | 33.1 | 20 | 13.1 |
| 42 | 150000000 | 21 | 43 | ○ | 49.1 | 13 | 29.1 |
| 43 | 200000000 | 19 | 40 | ○ | 65.2 | 10 | 45.2 |
| *44 | 50000000 | 21 | 22 | ○ | 17.7 | 40 | −2.3 |
| 45 | 150000000 | 23 | 23 | ○ | 53.1 | 13 | 33.1 |
| 46 | 200000000 | 24 | 23 | ○ | 70.4 | 10 | 50.4 |
| *47 | 50000000 | 28 | 21 | ○ | 19.3 | 40 | −0.7 |
| 48 | 100000000 | 27 | 22 | ○ | 37.9 | 20 | 17.9 |
| 49 | 150000000 | 26 | 23 | ○ | 56.6 | 13 | 36.6 |
| 50 | 200000000 | 26 | 22 | ○ | 75.2 | 10 | 55.2 |
| 51 | 50000000 | 26 | 26 | ○ | 20.2 | 40 | 0.2 |
| 52 | 100000000 | 25 | 25 | ○ | 40.2 | 20 | 20.2 |
| 53 | 150000000 | 25 | 24 | ○ | 60.4 | 13 | 40.4 |
| 54 | 200000000 | 26 | 25 | ○ | 80.2 | 10 | 60.2 |
| 55 | 50000000 | 20 | 35 | ○ | 21.8 | 40 | 1.8 |
| 56 | 100000000 | 21 | 34 | ○ | 42.7 | 20 | 22.7 |
| 57 | 150000000 | 20 | 34 | ○ | 64.3 | 13 | 44.3 |
| 58 | 200000000 | 22 | 35 | ○ | 85.2 | 10 | 65.2 |

TABLE 3

| | Paste Composition | | | | | | | | | Chip Properties |
|---|---|---|---|---|---|---|---|---|---|---|
| | Binder Component | | | | | | Content C of | | | |
| | | Ethyl Cellulose | | Cellulose Acetate Butyrate | | | Ceramic Raw Material | PVC | Viscosity | Side Surface Area S |
| Sample Number | Polyvinyl Butyral | A | B | A | B | C | (vol %) | (vol %) | (Pa·s) | (μm²) |
| *61 | 47 | 0 | 0 | 0 | 0 | 53 | 35.0 | 70.1 | 430 | 500000 |
| 62 | 47 | 0 | 0 | 0 | 18 | 35 | 35.0 | 70.1 | 500 | 500000 |
| 63 | 47 | 0 | 0 | 0 | 53 | 0 | 35.0 | 69.6 | 530 | 500000 |
| 64 | 47 | 0 | 0 | 0 | 35 | 18 | 35.0 | 70.1 | 570 | 500000 |
| 65 | 47 | 0 | 0 | 0 | 53 | 0 | 35.0 | 70.1 | 730 | 500000 |
| 66 | 47 | 0 | 0 | 18 | 35 | 0 | 35.0 | 70.1 | 1090 | 500000 |
| 67 | 47 | 0 | 0 | 0 | 53 | 0 | 35.0 | 70.0 | 1150 | 500000 |
| 68 | 29 | 0 | 0 | 0 | 71 | 0 | 35.0 | 60.0 | 1450 | 500000 |
| 69 | 47 | 0 | 0 | 35 | 18 | 0 | 35.0 | 70.1 | 1500 | 500000 |
| 70 | 19 | 0 | 0 | 0 | 0 | 81 | 35.0 | 50.0 | 2470 | 500000 |
| *71 | 47 | 0 | 0 | 53 | 0 | 0 | 35.0 | 70.1 | 2680 | 500000 |
| *72 | 24 | 0 | 0 | 0 | 76 | 0 | 35.0 | 55.0 | 2860 | 500000 |
| *73 | 19 | 0 | 0 | 0 | 20 | 61 | 35.0 | 50.0 | 3490 | 500000 |
| *74 | 19 | 0 | 0 | 0 | 40 | 41 | 35.0 | 50.0 | 5240 | 500000 |
| *75 | 19 | 0 | 0 | 0 | 81 | 0 | 35.0 | 50.0 | 5530 | 500000 |
| *76 | 19 | 0 | 0 | 0 | 60 | 20 | 35.0 | 50.0 | 5820 | 500000 |
| *77 | 19 | 0 | 0 | 0 | 81 | 0 | 35.0 | 50.0 | 6920 | 500000 |
| *78 | 47 | 0 | 0 | 0 | 53 | 0 | 22.5 | 69.6 | 80 | 500000 |
| *79 | 47 | 0 | 53 | 0 | 0 | 0 | 22.5 | 69.6 | 420 | 500000 |
| *80 | 47 | 53 | 0 | 0 | 0 | 0 | 22.5 | 69.6 | 2500 | 500000 |
| *81 | 47 | 53 | 0 | 0 | 0 | 0 | 22.5 | 69.6 | 2500 | 500000 |
| 82 | 47 | 53 | 0 | 0 | 0 | 0 | 22.5 | 69.6 | 2500 | 500000 |
| 83 | 47 | 53 | 0 | 0 | 0 | 0 | 22.5 | 69.6 | 2500 | 500000 |
| *84 | 47 | 0 | 0 | 0 | 53 | 0 | 25.0 | 69.6 | 100 | 500000 |
| *85 | 19 | 0 | 0 | 0 | 0 | 81 | 25.0 | 50.0 | 470 | 500000 |
| *86 | 100 | 0 | 0 | 0 | 0 | 0 | 25.0 | 50.0 | 650 | 500000 |
| *87 | 100 | 0 | 0 | 0 | 0 | 0 | 25.0 | 50.0 | 650 | 500000 |
| 88 | 100 | 0 | 0 | 0 | 0 | 0 | 25.0 | 50.0 | 650 | 500000 |
| 89 | 100 | 0 | 0 | 0 | 0 | 0 | 25.0 | 50.0 | 650 | 500000 |

| | Properties of Insulator Section | | | | | |
|---|---|---|---|---|---|---|
| | | | | | Guaranteed Thickness T = 30 μm | |
| | Metal Plate Groove Spatial Volume V | Thickness Variation (%) | | Horn Shape | Measured Thickness t | Required Amount of Ceramic Raw Material: (S·T/(V/2))· | Measured Thickness − Guaranteed |
| Sample Number | (μm³) | − | + | | (μm) | 100 | Thickness |
| *61 | 100000000 | 54 | 18 | ○ | 35.5 | 30 | 5.5 |
| 62 | 100000000 | 46 | 19 | ○ | 35.3 | 30 | 5.3 |
| 63 | 100000000 | 44 | 19 | ○ | 35.4 | 30 | 5.4 |
| 64 | 100000000 | 46 | 21 | ○ | 35.4 | 30 | 5.4 |
| 65 | 100000000 | 36 | 22 | ○ | 35.2 | 30 | 5.2 |
| 66 | 100000000 | 21 | 24 | ○ | 35.4 | 30 | 5.4 |
| 67 | 100000000 | 22 | 23 | ○ | 35.4 | 30 | 5.4 |
| 68 | 100000000 | 21 | 32 | ○ | 35.2 | 30 | 5.2 |
| 69 | 100000000 | 20 | 33 | ○ | 35.4 | 30 | 5.4 |
| 70 | 100000000 | 21 | 43 | ○ | 35.2 | 30 | 5.2 |
| *71 | 100000000 | 18 | 55 | ○ | 35.2 | 30 | 5.2 |
| *72 | 100000000 | 19 | 100 | X | 35.4 | 30 | 5.4 |
| *73 | 100000000 | 20 | 124 | X | 35.5 | 30 | 5.5 |
| *74 | 100000000 | 22 | 151 | X | 35.6 | 30 | 5.6 |
| *75 | 100000000 | 26 | 179 | X | 35.2 | 30 | 5.2 |
| *76 | 100000000 | 21 | 156 | X | 35.4 | 30 | 5.4 |
| *77 | 100000000 | 21 | 177 | X | 35.6 | 30 | 5.6 |
| *78 | 100000000 | 86 | 22 | ○ | 22.8 | 30 | −7.2 |
| *79 | 100000000 | 57 | 19 | ○ | 22.9 | 30 | −7.1 |
| *80 | 50000000 | 20 | 47 | ○ | 11.8 | 60 | −18.2 |
| *81 | 100000000 | 21 | 47 | ○ | 22.9 | 30 | −7.1 |
| 82 | 150000000 | 19 | 46 | ○ | 34.1 | 20 | 4.1 |
| 83 | 200000000 | 20 | 46 | ○ | 45.2 | 15 | 15.2 |
| *84 | 100000000 | 84 | 20 | ○ | 25.4 | 30 | −4.6 |
| *85 | 100000000 | 52 | 19 | ○ | 25.2 | 30 | −4.8 |
| *86 | 50000000 | 40 | 24 | ○ | 12.7 | 60 | −17.3 |

TABLE 3-continued

| Sample | | | | | | | |
|---|---|---|---|---|---|---|---|
| *87 | 100000000 | 41 | 22 | ○ | 25.2 | 30 | −4.8 |
| 88 | 150000000 | 41 | 23 | ○ | 37.9 | 20 | 7.9 |
| 89 | 200000000 | 40 | 21 | ○ | 50.4 | 15 | 20.4 |

TABLE 4

| | Paste Composition | | | | | | | | | Chip Properties |
|---|---|---|---|---|---|---|---|---|---|---|
| | Binder Component | | | | | | Content C of | | | |
| | | Ethyl Cellulose | | Cellulose Acetate Butyrate | | | Ceramic Raw | | | Side Surface |
| Sample | Polyvinyl | | | | | | Material | PVC | Viscosity | Area S |
| Number | Butyral | A | B | A | B | C | (vol %) | (vol %) | (Pa · s) | (μm²) |
| *90 | 47 | 0 | 0 | 0 | 53 | 0 | 27.5 | 69.6 | 140 | 500000 |
| *91 | 19 | 0 | 0 | 0 | 0 | 81 | 27.5 | 50.0 | 780 | 500000 |
| *92 | 19 | 0 | 0 | 0 | 0 | 81 | 27.5 | 50.0 | 780 | 500000 |
| 93 | 19 | 0 | 0 | 0 | 0 | 81 | 27.5 | 50.0 | 780 | 500000 |
| 94 | 19 | 0 | 0 | 0 | 0 | 81 | 27.5 | 50.0 | 780 | 500000 |
| *95 | 47 | 0 | 0 | 0 | 53 | 0 | 30.0 | 69.6 | 160 | 500000 |
| *96 | 19 | 0 | 0 | 0 | 0 | 81 | 30.0 | 50.0 | 1060 | 500000 |
| 97 | 19 | 0 | 0 | 0 | 0 | 81 | 30.0 | 50.0 | 1060 | 500000 |
| 98 | 19 | 0 | 0 | 0 | 0 | 81 | 30.0 | 50.0 | 1060 | 500000 |
| 99 | 19 | 0 | 0 | 0 | 0 | 81 | 30.0 | 50.0 | 1060 | 500000 |
| *100 | 19 | 0 | 0 | 0 | 0 | 81 | 32.5 | 50.0 | 2130 | 500000 |
| 101 | 19 | 0 | 0 | 0 | 0 | 81 | 32.5 | 50.0 | 2130 | 500000 |
| 102 | 19 | 0 | 0 | 0 | 0 | 81 | 32.5 | 50.0 | 2130 | 500000 |
| 103 | 19 | 0 | 0 | 0 | 0 | 81 | 32.5 | 50.0 | 2130 | 500000 |
| *104 | 47 | 0 | 0 | 0 | 53 | 0 | 35.0 | 70.0 | 1150 | 500000 |
| 105 | 47 | 0 | 0 | 0 | 53 | 0 | 35.0 | 70.0 | 1150 | 500000 |
| 106 | 47 | 0 | 0 | 0 | 53 | 0 | 35.0 | 70.0 | 1150 | 500000 |
| *107 | 47 | 0 | 0 | 0 | 53 | 0 | 37.5 | 69.6 | 960 | 500000 |
| 108 | 47 | 0 | 0 | 0 | 53 | 0 | 37.5 | 69.6 | 960 | 500000 |
| 109 | 47 | 0 | 0 | 0 | 53 | 0 | 37.5 | 69.6 | 960 | 500000 |
| 110 | 47 | 0 | 0 | 0 | 53 | 0 | 37.5 | 69.6 | 960 | 500000 |
| *111 | 47 | 0 | 0 | 0 | 53 | 0 | 40.0 | 69.6 | 1170 | 500000 |
| 112 | 47 | 0 | 0 | 0 | 53 | 0 | 40.0 | 69.6 | 1170 | 500000 |
| 113 | 47 | 0 | 0 | 0 | 53 | 0 | 40.0 | 69.6 | 1170 | 500000 |
| 114 | 47 | 0 | 0 | 0 | 53 | 0 | 40.0 | 69.6 | 1170 | 500000 |
| *115 | 47 | 0 | 0 | 0 | 53 | 0 | 42.5 | 69.6 | 1760 | 500000 |
| 116 | 47 | 0 | 0 | 0 | 53 | 0 | 42.5 | 69.6 | 1760 | 500000 |
| 117 | 47 | 0 | 0 | 0 | 53 | 0 | 42.5 | 69.6 | 1760 | 500000 |
| 118 | 47 | 0 | 0 | 0 | 53 | 0 | 42.5 | 69.6 | 1760 | 500000 |

| | Properties of Insulator Section | | | | | |
|---|---|---|---|---|---|---|
| | | | | | Guaranteed Thickness T = 30 μm | |
| | Metal Plate Groove Spatial | Thickness Variation (%) | | | Required Amount of Ceramic Raw Material: | Measured Thickness − |
| Sample | Volume V | | | Horn | Measured Thickness t | (S · T/(V/2)) · | Guaranteed |
| Number | (μm³) | − | + | Shape | (μm) | 100 | Thickness |
| *90 | 100000000 | 79 | 20 | ○ | 28.1 | 30 | −1.9 |
| *91 | 50000000 | 30 | 25 | ○ | 14.2 | 60 | −15.8 |
| *92 | 100000000 | 32 | 23 | ○ | 27.7 | 30 | −2.3 |
| 93 | 150000000 | 32 | 24 | ○ | 41.5 | 20 | 11.5 |
| 94 | 200000000 | 33 | 22 | ○ | 55.6 | 15 | 25.6 |
| *95 | 100000000 | 68 | 16 | ○ | 30.4 | 30 | 0.4 |
| *96 | 50000000 | 27 | 24 | ○ | 15.4 | 60 | −14.6 |
| 97 | 100000000 | 25 | 22 | ○ | 30.6 | 30 | 0.6 |
| 98 | 150000000 | 24 | 22 | ○ | 45.2 | 20 | 15.2 |
| 99 | 200000000 | 24 | 21 | ○ | 60.4 | 15 | 30.4 |
| *100 | 50000000 | 20 | 41 | ○ | 16.6 | 60 | −13.4 |
| 101 | 100000000 | 18 | 42 | ○ | 33.1 | 30 | 3.1 |
| 102 | 150000000 | 21 | 43 | ○ | 49.1 | 20 | 19.1 |
| 103 | 200000000 | 19 | 40 | ○ | 65.2 | 15 | 35.2 |
| *104 | 50000000 | 21 | 22 | ○ | 17.7 | 60 | −12.3 |
| 105 | 150000000 | 23 | 23 | ○ | 53.1 | 20 | 23.1 |
| 106 | 200000000 | 24 | 23 | ○ | 70.4 | 15 | 40.4 |

TABLE 4-continued

| | | | | | | | |
|---|---|---|---|---|---|---|---|
| *107 | 50000000 | 28 | 21 | ○ | 19.3 | 60 | −10.7 |
| 108 | 100000000 | 27 | 22 | ○ | 37.9 | 30 | 7.9 |
| 109 | 150000000 | 26 | 23 | ○ | 56.6 | 20 | 26.6 |
| 110 | 200000000 | 26 | 22 | ○ | 75.2 | 15 | 45.2 |
| *111 | 50000000 | 26 | 26 | ○ | 20.2 | 60 | −9.8 |
| 112 | 100000000 | 25 | 25 | ○ | 40.2 | 30 | 10.2 |
| 113 | 150000000 | 25 | 24 | ○ | 60.4 | 20 | 30.4 |
| 114 | 200000000 | 26 | 25 | ○ | 80.2 | 15 | 50.2 |
| *115 | 50000000 | 20 | 35 | ○ | 21.8 | 60 | −8.2 |
| 116 | 100000000 | 21 | 34 | ○ | 42.7 | 30 | 12.7 |
| 117 | 150000000 | 20 | 34 | ○ | 64.3 | 20 | 34.3 |
| 118 | 200000000 | 22 | 35 | ○ | 85.2 | 15 | 55.2 |

Tables 1 and 2 as well as Tables 3 and 4 each show experimental results on the thickness change of the insulator section in the case of changing the viscosity of the paste for insulator sections by changing the type of the binder component constituting the paste for insulator sections, etc., as well as changing the groove volume in the grooved metal plate, as listed in the above described experimental conditions. Tables 1 and 2 show experimental examples in the case of setting the guaranteed thickness of the insulator section at 20 μm, whereas Tables 3 and 4 show experimental examples in the case of setting the guaranteed thickness of the insulator section at 30 μm. In addition, for sample numbers 1 to 58 in Tables 1 and 2 and sample numbers 61 to 118 in Tables 3 and 4, sample numbers 1 and 61, 2 and 62, . . . respectively use the same paste compositions, the same chip properties, and the same grooved metal plates. It is to be noted that the mark * in each table refers to outside the scope of the present invention.

In Tables 1 and 2 as well as Tables 3 and 4 herein, the side surface area S among the chip properties indicates the area (μm$^2$) of a surface to be formed with an insulator section on a side surface of the laminate chip. In addition, PVC (Pigment Volume Concentration) is defined as indicating the volume percent of grains (pigment) in the solid content, but refers herein to a value obtained by the formula of {ceramic grains/(ceramic grains+solid binder component)}×100 [vol %]. In addition, the measured thickness of the insulator section in Tables 1 and 2 as well as Tables 3 and 4 was obtained as follows. More specifically, first, the laminate chip with the insulator sections was cut along the end surface, the condition of the insulator section (9 points) on one side surface was observed under a SEM, and the length from one side surface or the other side surface of the ceramic body to an end of the insulator section was measured as the thickness of the insulator section. The average value for the measurement results at the 9 points was figured out, and the average value was regarded as the value of the measured thickness. In addition, the thickness variation of the insulator section indicates the maximum value and minimum value of the increase or decrease rate for the respective values of the measurement results at the 9 points with respect to the measured thickness. The guaranteed thickness of the insulator section refers to a target thickness for an insulator section formed on the side surface of the laminate chip. In addition, the horn shape refers to the result of determining whether or not the paste for insulator sections applied to the laminate chip was formed in a horn shape.

The viscosity of the paste for insulator sections in Example 1 was determined so that the thickness variation was kept within the range of ±50% as compared with the measured thickness, and no abnormality was caused in the shape of the insulator section. It is to be noted that in the determination of whether the shape of the insulator section is abnormal or not, the insulator section with no horn-shaped projection or the like formed was regarded as "○". As a result, it was confirmed that when the viscosity of the paste for insulator sections at 25° C. is 500 Pa·s or more and 2500 Pa·s or less, the thickness variation was reduced, and the shape of the insulator section has no horn-shaped projection or the like.

Subsequently, among the selected pastes for insulator sections without any problems related to the thickness variation of the insulator section and the shape of the insulator section, the relationship between the ceramic raw material in the paste for insulator sections and the spatial volume in the grooves of the grooved metal plate was checked from the relationship between the measured thickness and the guaranteed thickness. The measured value of the measured thickness of the insulator section for each paste for insulator sections roughly coincides with the value calculated on the assumption that the paste for insulator sections that corresponds to ½ or more of the spatial volume in the grooves of the grooved metal plate is applied to the laminate chip, and will not be smaller than the calculated value. This result has revealed that the ceramic raw material in the paste for insulator sections only has to satisfy the following formula 2, for achieving the guaranteed thickness of the insulator section.

$$C \geq (S \times t/(V/2)) \times 100 \qquad \text{[Formula 2]}$$

In the formula, C represents the content (vol %) of the ceramic raw material, t represents the guaranteed thickness (μm) of an insulator section, S represents the area (μm$^2$) of a surface to be formed with the insulator section, and V represents the groove volume (μm$^3$) of the grooved metal plate corresponding to one laminate chip. It is to be noted that the guaranteed thickness refers to a target thickness for an insulator section formed on the side surface of the laminate chip.

Accordingly, the experimental results have revealed that in order to form insulator sections with a desired thickness on the side surfaces of the laminate chip, the viscosity of the paste for insulator sections at 25° C. is preferably 500 Pa·s or more and 2500 Pa·s or less, and furthermore, there is a need to satisfy the condition of the formula 2 mentioned above.

Furthermore, Tables 1 and 2 are different from Tables 3 and 4 in guaranteed thickness, i.e., 20 μm and 30 μm, respectively. As described, it can be understood that when the guaranteed thickness is 30 μm, there are more Comparative Examples outside the claims of the present invention as compared with the case of 20 μm. Accordingly, it was revealed that, when setting the increased guaranteed thickness, the application conditions have to be appropriately changed. This suggests that the allowed condition in which electrical properties of the laminated ceramic electronic component can be maintained becomes severe by setting the increased guaranteed thickness.

Example 2

Next, another example will be described on the method for manufacturing a laminated ceramic electronic component according to the present invention. The method for manufacturing a laminated ceramic electronic component according to Example 2 is a method of manufacturing a laminated ceramic electronic component by printing an electrode in a stripe pattern on a plurality of ceramic green sheets, stacking the ceramic green sheets, cutting the stacked ceramic green sheets to create laminate chips with side-surface electrodes exposed, and then pressing the laminate chips against a grooved metal plate with any volume of grooves filled with a paste for insulator sections as in the case of Example 1.

An example of the present invention will be given with reference to a laminated ceramic electronic component with the use of polyvinyl butyral having a high molecular weight and many hydroxyl groups for a binder for the formation of ceramic green sheets. For the paste solvent, a solvent immiscible solvent in the binder component contained in the ceramic layers of the laminated body and a solvent miscible in the binder component contained in the ceramic layers of the laminated body were used to prepare pastes for insulator sections. With the use of each paste for insulator sections, insulator sections were formed on the laminate chips to prepare laminated ceramic electronic components, and the short-circuit rate was checked for the components. Further, experimental conditions according to Example 2 are as follows.

Experimental Condition
Size of Laminate Chip: L 1.0 mm×W 0.5 mm×T 0.5 mm
The Number of Laminate Chips: 990 (arrangement of 45 columns×22 rows on adhesive rubber)
Arrangement Interval for Laminate Chips: 1.0 mm (column-to-column), 2.0 mm (row-to-row)
Organic Component for Laminate Chip
Dielectric Layer:
(Binder Component): Polyvinyl butyral <<Weight Average Molecular Weight: 200000, Hydroxyl Group: 34 mol %>>
(Plasticizer): Dioctyl phthalate
Internal Electrode (Conductive Film)
(Binder Component): Ethyl cellulose
(Plasticizer) Alkyd
Organic Component of Paste for Insulator Sections
(Binder Component): Cellulose butyrate acetate
(Plasticizer) Dioctyl phthalate
(Solvent) Dihydroterpinyl acetate, Terpineol
Spatial Volume of Grooved Metal Plate (Spatial Volume of Grooves corresponding to one laminate chip):
1.0 mm×1.0 mm×0.10 mm

TABLE 5

| Adhesive Solvent | Short-Circuit Rate [%] |
| --- | --- |
| Dihydroterpineol Acetate | 0.0 |
| Terpineol | 100.0 |

Table 5 shows the relationship between the paste solvent contained in the paste for insulator sections and the short-circuit rate of the laminated ceramic electronic component. As shown in Table 5, the short-circuit rate was 0% in the case of the paste with the use of, for the paste solvent in the paste for insulator sections, dihydroterpineol acetate immiscible in the organic component forming the ceramic layers of the laminate chip. On the other hand, the short-circuit rate was 100% in the case of the paste with the use of, for the paste solvent, terpineol miscible in the binder component forming the ceramic layers of the laminate chip. This result has revealed that there is a need to use, for the paste solvent, a solvent that is immiscible in the binder component forming the ceramic layers of the laminate chip.

In the method for manufacturing a laminated ceramic electronic component according to the present invention, a laminated ceramic electronic component including insulator sections with a desired thickness can be achieved, when the viscosity of the paste for insulator sections is set at 500 Pa·s or more and 2500 Pa·s or less, and when the content of the ceramic raw material satisfies a predetermined condition, and thus a highly reliable laminated ceramic electronic component with stable electrical properties can be achieved.

In addition, in the present embodiment, as the paste for insulator sections, by using a paste solvent that is immiscible in the binder component contained in the ceramic layers of the laminate chip, a laminated ceramic electronic component with stable electrical properties can be achieved, because the binder component forming the ceramic layers of the laminate chip is not dissolved by the paste solvent.

While the laminate chips are swung for the separation from the grooved metal plate by swinging the holding plate in any manner in vertical and horizontal directions in Examples according to the present invention, the present invention is not to be considered to these Examples, and the laminate chips may be pulled away by swinging the grooved metal plate in any manner in vertical and horizontal directions.

In addition, while the ceramic body according to the embodiment of the present invention functions as a capacitor because of the use of a dielectric ceramic, the present invention is not to be considered limited to the embodiment, and the ceramic body functions as a piezoelectric component when a piezoelectric ceramic is used, functions as a thermistor when a semiconductor ceramic is used, and functions as an inductor when a magnetic ceramic is used. Furthermore, when the ceramic body functions as an inductor, the internal electrodes serve as coiled conductors.

The invention claimed is:

1. A method for manufacturing a laminated ceramic electronic component, the method comprising:
preparing a laminate chip having a stacked plurality of ceramic layers and a plurality of internal electrodes, and wherein opposed end edges of the internal electrodes are exposed at first and second side surfaces of the laminate chip;
forming a first insulator section by applying a paste on the first side surface of the laminate chip by pressing the laminate chip against a metal plate with a volume of grooves filled with the paste;
forming a second insulator section by applying the paste on the second side surface of the laminate chip by pressing the laminate chip against the metal plate; and
firing the laminate chip with the first insulator section and the second insulator section formed thereon,
wherein the paste has a viscosity of 500 Pa·s to 2500 Pa·s, and a content C (vol %) of an inorganic solid satisfies $C \geq (S \times t/(V/2)) \times 100$, where t represents a guaranteed thickness ($\mu m$) of an insulating layer, S represents an area ($\mu m^2$) of a surface with the insulating layer formed thereon, and V represents a groove volume ($\mu m^3$) of the metal plate corresponding to one laminate chip.

2. The method for manufacturing a laminated ceramic electronic component according to claim 1, wherein the paste is a ceramic paste.

3. The method for manufacturing a laminated ceramic electronic component according to claim 1, wherein more than one laminate chip is aligned when forming the first insulator section.

4. The method for manufacturing a laminated ceramic electronic component according to claim 3, wherein the metal plate or the laminate chip is swung in any direction in pulling the laminate chip away from the metal plate when forming the first insulator section.

5. The method for manufacturing a laminated ceramic electronic component according to claim 4, wherein the metal plate or the laminate chip is swung in any direction in pulling the laminate chip away from the metal plate when forming the second insulator section.

6. The method for manufacturing a laminated ceramic electronic component according to claim 1, wherein a solvent component constituting the paste is immiscible in a binder component contained in the laminate chip.

7. The method for manufacturing a laminated ceramic electronic component according to claim 1, wherein the grooves are in a cuboidal concave shape.

8. The method for manufacturing a laminated ceramic electronic component according to claim 7, wherein the grooves are in a grid-like pattern in a crossing direction with respect to a length direction of the laminate chip.

9. The method for manufacturing a laminated ceramic electronic component according to claim 1, wherein the grooves are in a grid-like pattern in a crossing direction with respect to a length direction of the laminate chip.

10. The method for manufacturing a laminated ceramic electronic component according to claim 1, further comprising forming external electrodes on outer end surfaces of the laminate chip.

\* \* \* \* \*